United States Patent
Borate et al.

(10) Patent No.: US 11,263,171 B2
(45) Date of Patent: Mar. 1, 2022

(54) UNIFIED TIME-INDEXED CATALOGUE FOR MULTIPLE ARCHIVED SNAPSHOTS

(71) Applicant: Druva, Inc., Sunnyvale, CA (US)

(72) Inventors: Milind Borate, Pune (IN); Shekhar S. Deshkar, Pune (IN); Nikhil Singhal, Pune (IN)

(73) Assignee: Druva Inc., Sunnyvale, CA (US)

( * ) Notice: Subject to any disclaimer, the term of this patent is extended or adjusted under 35 U.S.C. 154(b) by 783 days.

(21) Appl. No.: 15/075,881

(22) Filed: Mar. 21, 2016

(65) Prior Publication Data

US 2017/0169038 A1 Jun. 15, 2017

(30) Foreign Application Priority Data

Dec. 9, 2015 (IN) .............................. 6577/CHE/2015

(51) Int. Cl.
| | | |
|---|---|---|
| *G06F 16/11* | (2019.01) | |
| *G06F 11/14* | (2006.01) | |
| *G06F 16/22* | (2019.01) | |
| *G06F 16/18* | (2019.01) | |

(52) U.S. Cl.
CPC ........ *G06F 16/113* (2019.01); *G06F 11/1451* (2013.01); *G06F 16/128* (2019.01); *G06F 16/1873* (2019.01); *G06F 16/22* (2019.01)

(58) Field of Classification Search
CPC ......... G06F 17/30073; G06F 17/30088; G06F 17/3023; G06F 17/30312; G06F 11/1451; G06F 16/113; G06F 16/22; G06F 16/1873; G06F 16/128

USPC .......................................................... 707/673
See application file for complete search history.

(56) References Cited

U.S. PATENT DOCUMENTS

| | | | | |
|---|---|---|---|---|
| 5,604,862 A | * | 2/1997 | Midgely ............. | G06F 11/1448 710/39 |
| 5,649,200 A | * | 7/1997 | Leblang .................... | G06F 8/71 707/999.202 |
| 6,574,640 B1 | * | 6/2003 | Stahl ....................... | G06F 16/93 707/661 |
| 7,680,830 B1 | * | 3/2010 | Ohr ....................... | G06F 16/125 707/999.2 |
| 7,693,877 B1 | | 4/2010 | Zasman | |
| 7,761,456 B1 | * | 7/2010 | Cram .................. | G06F 11/1435 707/754 |
| 7,797,279 B1 | * | 9/2010 | Starling .............. | G06F 11/1451 707/641 |
| 8,170,991 B1 | * | 5/2012 | Dhakras .............. | G06F 11/1448 707/640 |
| 8,621,240 B1 | * | 12/2013 | Auchmoody ....... | G06F 21/6272 713/193 |
| 9,292,521 B1 | * | 3/2016 | Goo ..................... | G06F 16/2358 |
| 9,342,524 B1 | * | 5/2016 | Doty ..................... | G06F 16/137 |
| 2003/0046313 A1 | * | 3/2003 | Leung ................. | G06F 11/1469 |
| 2003/0120751 A1 | * | 6/2003 | Husain .................. | H04L 67/325 709/219 |

(Continued)

*Primary Examiner* — Tony Mahmoudi
*Assistant Examiner* — Michael Le
(74) *Attorney, Agent, or Firm* — Fenwick & West LLP

(57) ABSTRACT

A system, method, and non-transitory computer-readable medium provide backup and archive services for computing devices. Typically, multiple backup snapshots are archived together in each archive cycle. A catalogue for the current archive is efficiently created by starting with a copy of the previous archive catalogue and updating it based on metadata associated with the backup snapshots.

25 Claims, 9 Drawing Sheets

(56) References Cited

U.S. PATENT DOCUMENTS

| | | |
|---|---|---|
| 2005/0044089 A1* | 2/2005 | Wu ................... G06F 16/288 |
| 2005/0055519 A1 | 3/2005 | Stuart et al. |
| 2006/0010150 A1* | 1/2006 | Shaath ................ G06F 16/125 |
| 2007/0185936 A1* | 8/2007 | Derk ................. G06F 11/1451 |
| 2007/0288490 A1* | 12/2007 | Longshaw .......... G06F 11/1464 |
| 2008/0034268 A1* | 2/2008 | Dodd .................... H03M 7/30 714/755 |
| 2008/0222219 A1* | 9/2008 | Varadarajan .......... G06F 16/128 |
| 2008/0307333 A1* | 12/2008 | McInerney ......... G06F 11/1448 715/764 |
| 2009/0043774 A1* | 2/2009 | Sudhakar ............ G06F 21/6227 |
| 2009/0089340 A1* | 4/2009 | Ohr .................... G06F 11/1458 |
| 2010/0161561 A1* | 6/2010 | Moore .................... G06F 16/13 707/661 |
| 2011/0093471 A1 | 4/2011 | Brockway et al. |
| 2012/0124306 A1* | 5/2012 | Abercrombie ...... G06F 11/1451 711/162 |
| 2012/0179656 A1 | 7/2012 | Bunte et al. |
| 2013/0111262 A1* | 5/2013 | Taylor ................ G06F 11/2089 714/4.11 |
| 2015/0261776 A1 | 9/2015 | Attarde et al. |
| 2015/0261792 A1 | 9/2015 | Attarde et al. |
| 2016/0139836 A1 | 5/2016 | Nallathambi et al. |

\* cited by examiner

UNIFIED TIME-INDEXED CATALOGUE FOR MULTIPLE ARCHIVED SNAPSHOTS

CROSS REFERENCE TO RELATED APPLICATIONS

This application claims the right of priority based on India application serial no. 6577/CHE/2015, filed Dec. 9, 2015, which is incorporated by reference in its entirety.

BACKGROUND

1. Field of Invention

The disclosure generally relates to the field of data backup, and in particular to providing a unified time-indexed catalogue for multiple snapshots archived to long-term storage.

2. Background Information

To protect against data loss, an enterprise may periodically backup data stored on its computers to a backup server or service. Such a backup typically comprises content (e.g., the actual content stored in the body of files) and metadata, such as file names, time-stamps, access-control information, and the like. An individual backup (e.g., including content and the corresponding metadata) is referred to herein as a "snapshot." Generally, the content is stored as raw blocks of data or objects. In contrast, the metadata are stored in a database system on a server (or by a service). Thus, the metadata are searchable using the indexing functionality of the database.

For long-term retention of older snapshots, they may be archived to archival storage. Archival storage is often off-line and non-searchable. To limit the impact of metadata corruption, archives typically employ self-contained metadata for a small number of consecutive snapshots. Such metadata for archived snapshots is referred to herein as an archive catalogue. Typically, snapshots from a one-month period share a single catalogue.

DETAILED DESCRIPTION

Figure 1:
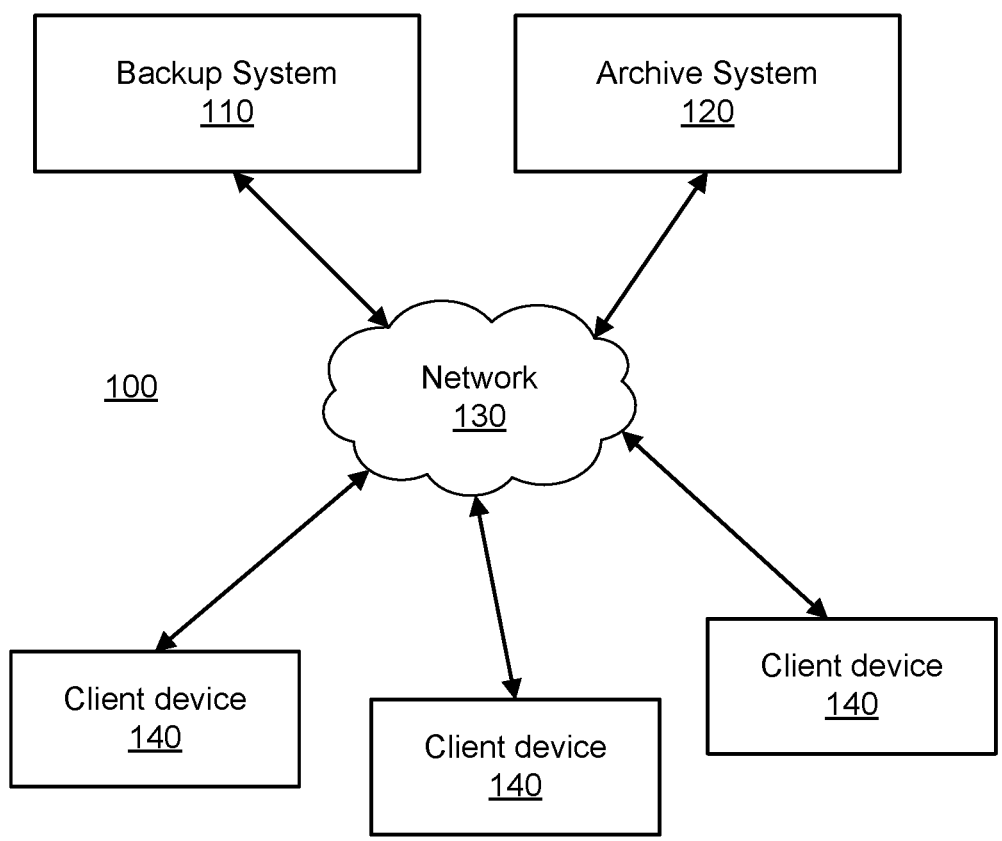
FIG. 1 is a high-level block diagram of a networked computing environment providing unified time-indexed cataloguing of archived snapshots, according to one embodiment.

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

System Overview

A system, method, and non-transitory computer-readable medium provide backup and archive services for computing devices. In an example embodiment, data from the computing devices is backed-up regularly (e.g., hourly, daily, weekly, etc.), storing a snapshot of the data and corresponding metadata in a data store. While some data changes between consecutive backup cycles, most data is often unchanged between one backup snapshot and the next. In order to optimize resource utilization, consecutive backup snapshots leverage metadata of previous snapshots, which are stored in a time-indexed, searchable format.

The backup data are stored for a relatively short period of time (e.g., six months, one year, etc.) before being archived to long-term storage. Typically, several backup snapshots (e.g., a month's worth) are archived together, sharing a single catalogue. As with backups, it is likely that consecutive catalogues will contain a substantial amount of duplicate metadata. However, unlike the backup metadata, the catalogue is stored serially and is thus searchable only via brute force (e.g., stepping through the catalogue one entry at a time). In one embodiment, the system efficiently constructs the catalogue for the current archive by starting with a copy of the previous archive catalogue and updating it based on the current searchable backup metadata. This also allows older backup data to be retired as the archiving process does not need to reference it once it has been incorporated into a catalogue.

One embodiment of the system includes a backup system and an archive system. The backup system receives a plurality of snapshots from a client device. Each snapshot includes one or more data files to be backed up and corresponding metadata. The archive system is communicably coupled to the backup system and includes a non-transitory computer-readable medium storing computer program code for creating a current archive. When executed, the computer program code causes the archive system to identify a set of the plurality of snapshots to be included in the current archive and add files included in the snapshots in the set to the current archive. The computer program code also causes the archive system to copy an archive catalogue of a previous archive and update the archive catalogue based on the metadata of snapshots included in the set.

Another embodiment of the system includes an archive data store, an archive catalogue store, and an archive creation module. The archive data store stores data archives, with each data archive including data from one or more backup snapshots. The archive catalogue store stores one or more archive catalogues, with the archive catalogues including metadata corresponding to the data archives. The archive creation module is configured to create a new data archive by executing computer program code. When executed, the computer program code causes one or more processors to receive a set of snapshots to be included in the new archive and add files included in the snapshots to the new data archive. The computer program code also causes one or more processors to create a new catalogue for the new data archive based on an existing catalogue stored in the archive catalogue store. The new catalogue includes a creation version, a deletion version, and a location of at least one file in the new data archive.

One embodiment of the method includes receiving a plurality of snapshots, each snapshot including one or more files to be backed up and corresponding metadata. The method also includes identifying a set of the plurality of snapshots to be included in a current archive and adding files included in the snapshots in the set to the current archive. The method further includes copying an archive catalogue of a previous archive and updating the archive catalogue based on the metadata of snapshots included in the set.

One embodiment of the non-transitory computer-readable medium stores computer program code that includes instructions. When executed, the computer program code causes one or more processors to receive a plurality of snapshots, each snapshot including one or more files to be backed up and corresponding metadata. The computer program code also causes the one or more processors to identify a set of the plurality of snapshots to be included in a current archive and add files included in the snapshots in the set to the current archive. The computer program code further causes the one or more processors to copy an archive catalogue of a previous archive and update the archive catalogue based on the metadata of snapshots included in the set.

Exemplary Networked Computing Environment

FIG. 1 shows a networked computing environment 100 suitable for providing data archiving using a unified time-indexed catalogue for multiple snapshots, consistent with one embodiment. The networked computing environment may be maintained by an enterprise, university, or other entity wishing to provide backup and archive services for data stored on computing devices. In the embodiment shown in FIG. 1, the networked computing environment 100 includes client devices (client computing devices) 140, a backup system (backup system computing device) 110, and an archive system (archive system computing device) 120, all connected via a network 130. In other embodiments, the networked computing environment 100 contains different or additional elements. In addition, the functions may be distributed among the elements in a different manner than described herein. For example, in one embodiment, a single system provides the functionality attributed to the backup system 110 and archive system 120.

The client devices 140 are computers that store data that the enterprise or owner seeks to have backed up. Typically, the client devices 140 are desktop and laptop computers, but they may include personal digital assistants (PDAs), smartphones, tablets, and the like. Although only three client devices 140 are shown in FIG. 1, the networked computing environment 100 may include many more (e.g., hundreds of) client devices. An example of a computing device architecture is described with FIG. 7.

The backup system 110 creates and stores backups of data found on the client devices 140. In one embodiment, the backup system 110 receives snapshots from the client devices 140. The backup system 110 stores the snapshots and creates/updates a searchable index using the metadata included therein. Exemplary embodiments of the backup system 110 are described in detail below, with reference to FIG. 2.

The archive system 120 creates and stores archives of the backup data for long-term storage. Note that although the archive system 120 is shown as connected to the network 130, in some implementations, the archive data is stored on non-transitory media (e.g., tapes, optical drives, or solid state drives) that are not network-accessible without physically connecting them to a computer system. In one embodiment, the archive system 120 receives a plurality of snapshots to be archived together (e.g., all snapshots from a particular month) from the backup system 110. The archive system 120 creates an archive including the content data in the snapshots and a catalogue including the corresponding metadata, including the location(s) of each file in the archive. In this embodiment, the catalogue is stored as a serial list of entries that is searchable only using brute force techniques, as described above. Exemplary embodiments of the archive system and the catalogue are described in detail below, with reference to FIGS. 3-6.

The network 130 communicatively couples the client devices 140, backup system 110, and archive system 130. In one embodiment, the network 130 uses standard communications technologies and protocols, such as the Internet. Thus, the network 130 can include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 130 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), etc. The data exchanged over the network 130 can be represented using technologies and formats including image data in binary form (e.g., Portable Network Graphics (PNG)), hypertext markup language (HTML), extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. In another embodiment, the entities on the network 130 can use custom or dedicated data communications technologies instead of, or in addition to, the ones described above. Although FIG. 1 shows the various elements communicating via a single network 130, in some embodiments, different elements communicate via different networks. For example, the client devices 140 may communicate with the backup system 110 via one network, while the backup and archive systems may communicate with each other via another.

Exemplary Backup and Archiving Systems

Figure 2:
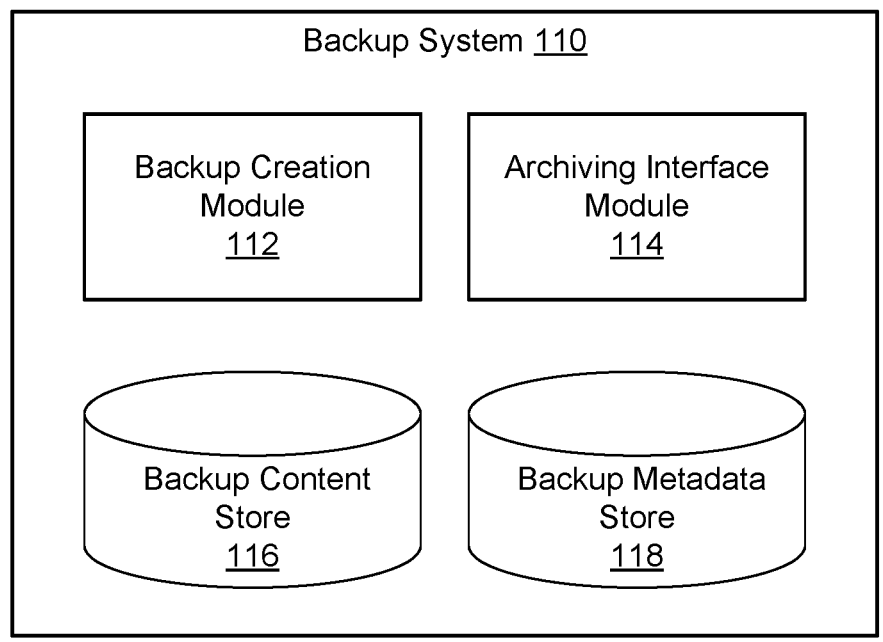
FIG. 2 is a high-level block diagram illustrating one embodiment of a backup system such as the one shown in FIG. 1.

FIG. 2 shows one embodiment of the backup system 110 suitable for use in the networked computing environment 100. In the embodiment shown in FIG. 2, the backup system 110 includes a backup creation module 112, an archive interfacing module 114, a backup content store 116, and a backup metadata store 118. In other embodiments, the backup system 110 contains different or additional elements. In addition, the functions may be distributed among the elements in a different manner than described herein. For example, in one embodiment, the backup content store 116 and the backup metadata store 118 are combined and provided as a single snapshot data store. It is noted that the modules here and elsewhere may be computing modules embodied and hardware, software, or a combination thereof. For example, software modules may be embodied as program code (e.g., instructions) stored in as computing storage and executed by a processor of a computing device such as described with FIG. 7. A hardware module (and combination thereof) may be embodied by an application specific integrated circuit (ASIC) or field programmable array (FPGA).

The backup creation module 112 creates backups of data stored on the client devices 140. The backups may be triggered by either the backup system or the client device, either on a regular schedule or in response to user input. In one embodiment, the backup creation module 112 polls each user device 140 at a set time each day and receives files to be backed up and corresponding metadata, such as file names, file sizes, access time-stamps, access control information, and the like. The backup creation module 112 then stores the files currently located on the client device 140 in the backup content store 116 and stores the corresponding metadata in the backup metadata store 118. Thus, the stored content and metadata are collectively a snapshot of the content stored on the client device 140 at the time of the backup. In other embodiments, the backup creation module 112 leverages data from previous backup cycles to reduce the amount of data it needs to retrieve from the client devices 140 in creating snapshots. One of skill in the art will appreciate various methods and techniques for achieving this.

The archiving interface module 114 provides an interface for the archive system 120 to access the snapshots stored in the backup snapshot store 116 and the backup metadata store 118. In one embodiment, the archiving interface module 114 provides functions to (1) identify the first snapshot in which a file appears; (2) identify the last snapshot in which a file appears; (3) identify when all of a set of files are not present in the most recent snapshot; and (4) delete content and the corresponding metadata once they have been archived. In other embodiments, the archiving interface module 114 provides different or additional functionality to the archive system 120. How these functions are used is described in detail below, with reference to the archive system 120 and FIG. 3.

The backup content store 116 and backup metadata store 118 are one or more non-transitory computer-readable storage media that store the content and corresponding metadata, respectively. Although FIG. 2 shows them as separate elements, a single computer-readable storage medium (or set of storage media) may be used to store both the content and the corresponding metadata. In one embodiment, the content is stored as raw blocks of data and the corresponding metadata is stored in a searchable database. The metadata describing each file includes one or more pointers indicating where the file can be found in the backup content store 116.

Figure 3:
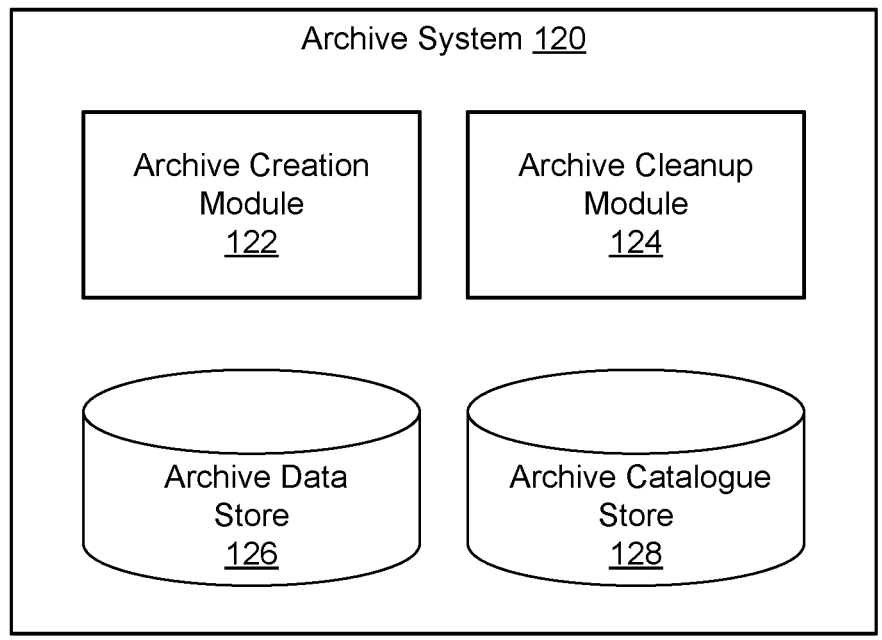
FIG. 3 is a high-level block diagram illustrating one embodiment of an archive system such as the one shown in FIG. 1.

FIG. 3 shows one embodiment of an archive system 120 suitable for use in the networked computing environment 100. In the embodiment shown in FIG. 3, the archive system 120 includes an archive creation module 122, an archive cleanup module 124, an archive data store 126, and an archive catalogue store 128. In other embodiments, the archive system 120 contains different or additional elements. In addition, the functions may be distributed among the elements in a different manner than described herein. For example, in one embodiment, the archive data store 116 and the archive catalogue store 118 are combined and provided as a single data store.

The archive creation module 122 creates archives of backup snapshots after a backup retention period has expired. In one embodiment, the archives are created on a fixed schedule. For example, the archive creation module 122 may archive all snapshots created in a month the last day of the same month the next year, thus making the backup retention period one year. Typical implementations use a backup retention period in the range of six months to two years, although other periods may be used. In other embodiments, other methods are used to trigger archiving, such as requiring a human operator to initiate the archiving and provide the time-range for which snapshots will be archived.

In various embodiments, the archive creation module 122 identifies one or more backup snapshots that are due to be archived based on the age of the snapshots. The archive creation module 122 then stores the files and folders included in the snapshots in the archive data store 126. If multiple snapshots include identical copies of the same file or folder, then the archive creation module 122 may only include a single copy in the archive data store 126 to increase storage efficiency. The archive creation module 122 also creates a catalogue for the archive and stores it in the archive catalogue store 128. In one embodiment, the archive catalogue is based in part on the catalogue of a previously created archive. Exemplary structures for the archive and catalogue are described in detail below, with reference to FIGS. 4-6. Exemplary methods for creating the archive catalogue are described in detail below, with reference to FIGS. 8-11.

The archive cleanup module 124 determines when archives can be deleted and removes them from the archive catalogue store 128. Typically, archives are retained for ten to fifteen years, although other archive retention periods may be used. In one embodiment, the archive retention period does not begin until all of the files included in the archive are no longer present in the current backup snapshots generated by the backup creation module 112. To implement this, the archive cleanup module 124 uses the functions provided by the archiving interface module 114. In another embodiment, the backup system 110 tracks which files are included in a given archive and notifies the archive system 120 when the archive retention period should begin. One of skill in the art will recognize various ways for determining the point at which the archive retention period for a given archive begins. Regardless of the method used to determine when this period begins, once it has expired, the archive cleanup module 124 flags the archive for deletion, making the corresponding storage space available for new archives.

The archive data store 116 and archive catalogue store 118 are one or more non-transitory computer-readable storage media that store the archive data and corresponding catalogues, respectively. Although FIG. 3 shows them as separate elements, a single computer-readable storage medium (or set of storage media) may be used to store both the archive data and the catalogues. In one embodiment, the archive data are stored as raw blocks of data and the catalogue is stored as a serial list on entries denoting creation version, deletion version, and location in the archive of each file. The creation version indicates the first snapshot in which the file appears, while the deletion version indicates the last snapshot in which the file appears. Alternatively, the deletion version may indicate the first snapshot in which the file does not appear. If a file is still present in the last snapshot in an archive, then the deletion version is set to infinity, indicating that the file may still be present on the client device 140 and may appear in future snapshots. Note that although the term infinity is used, this should not be taken to require the storage of any particular value. It is merely used to denote that the deletion version is set to a value of values that the system interprets as indicating the file is yet to be deleted from the client device 140 (or was deleted after the last backup). Thus, the metadata entries do not have to be duplicated in the catalogue for each snapshot. In other embodiments, different approaches are used to indicate when files were created and deleted. For example, rather than using creation and deletion versions, the catalogue can store a creation time-stamp indicating when the file was created and a deletion time-stamp indicating when the file was deleted (or "infinity" if the file is yet to be deleted.

Exemplary Data Structures

Figure 4:
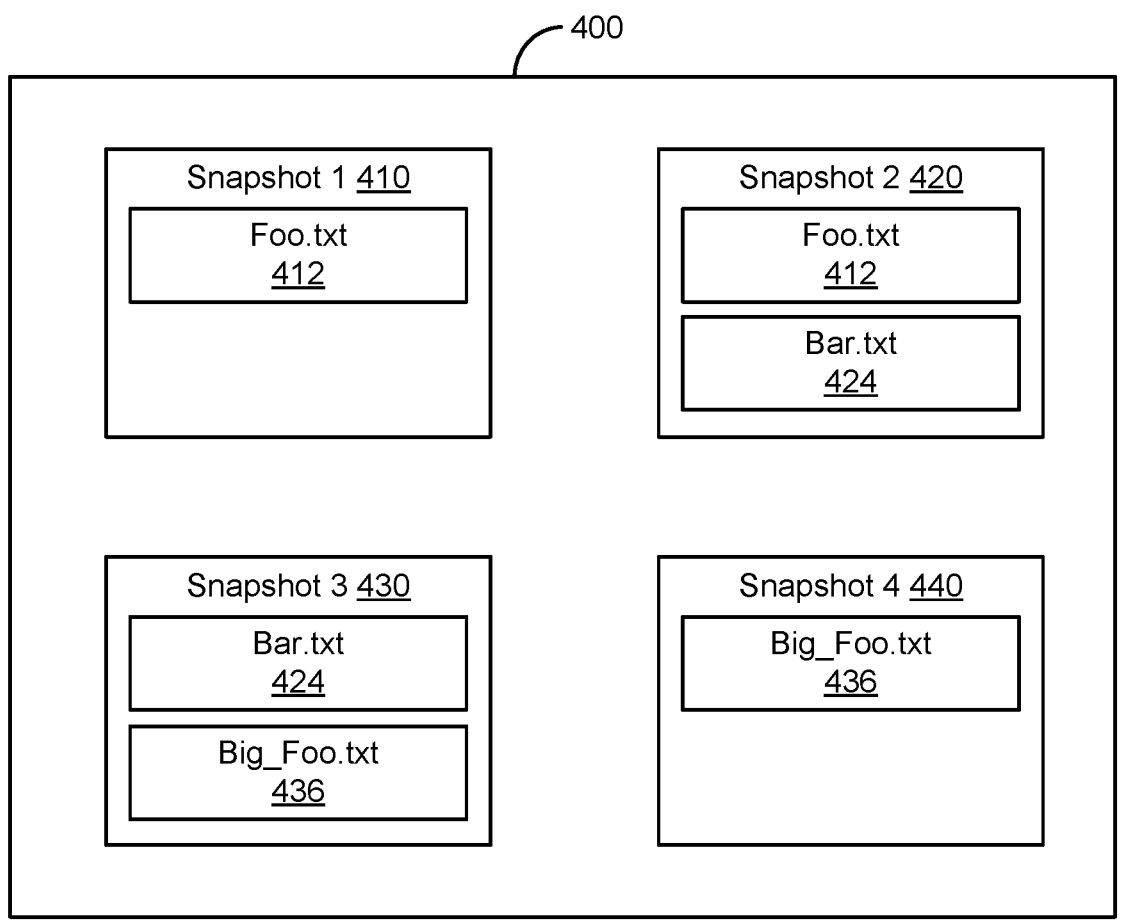
FIG. 4 is a high-level block diagram illustrating a set of backup snapshots for archiving together, according to one embodiment.

FIG. 4 shows a set of snapshots 400 that are to be archived together, consistent with one embodiment. The set of snapshots 400 collectively includes three files, Foo.txt 412, Bar.txt 424, and Big_Foo.txt 436. However, in practice, sets of snapshots will typically include many more (e.g., hundreds or thousands of) files. The first snapshot 410 includes just Foo.txt 412. The second snapshot 420 includes Foo.txt 412 and Bar.txt 424. The third snapshot 430 includes Bar.txt 424 and Big_Foo.txt 436. The fourth snapshot 440 includes just Big_foo.txt 436. In one embodiment, the creation version for Foo.txt 412 is snapshot 1 410, while its deletion version is snapshot 2 420, because these are the first and last snapshots in which the file appears. Similarly, the creation and deletion versions of Bar.txt 424 are snapshot 2 420 and snapshot 3 430, respectively. For Big_Foo.txt 436, the creation version is snapshot 3 430 and the deletion version is infinity, because the file is present in the last snapshot of the set (snapshot 4 440).

Figure 5:
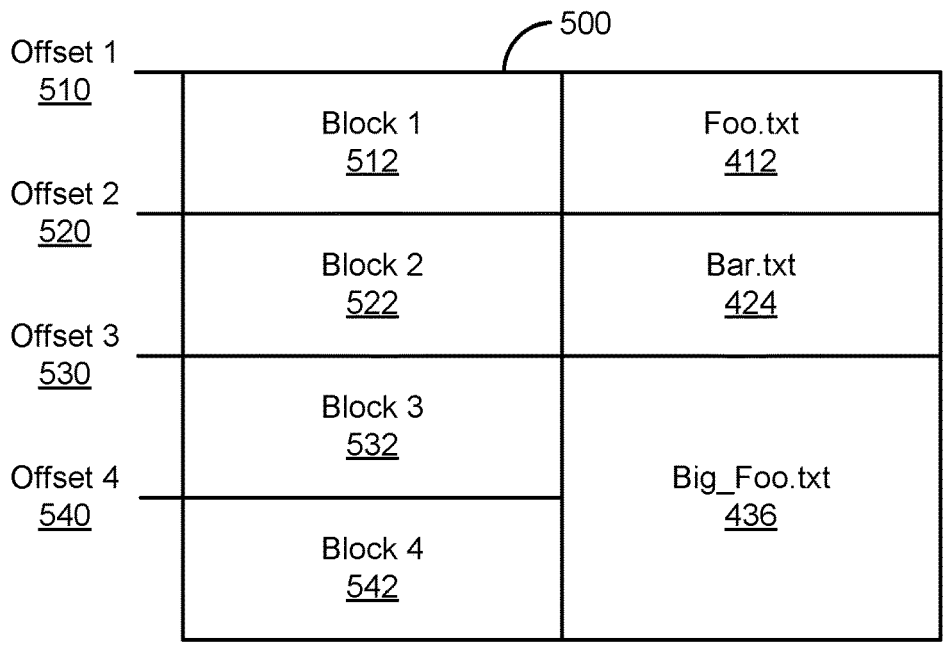
FIG. 5 is a high-level block diagram illustrating an archive, according to one embodiment.

FIG. 5 shows one embodiment of the archive 500 created from the set of snapshots 400 shown in FIG. 4. In the embodiment shown in FIG. 5, the first file (Foo.txt) 412 is stored in a first block 512 at a first offset 510. Similarly, the second file (Bar.txt) 524 is stored in a second block 522 at a second offset 520. However, the third file (Big_Foo.txt) 534 is larger and requires more than one block in the archive 500. Therefore, the third file 534 is stored in both a third block 532 and a fourth block 542, at a third offset 530 and a fourth offset 540, respectively. In other embodiments, other archive structures are used.

Figure 6:
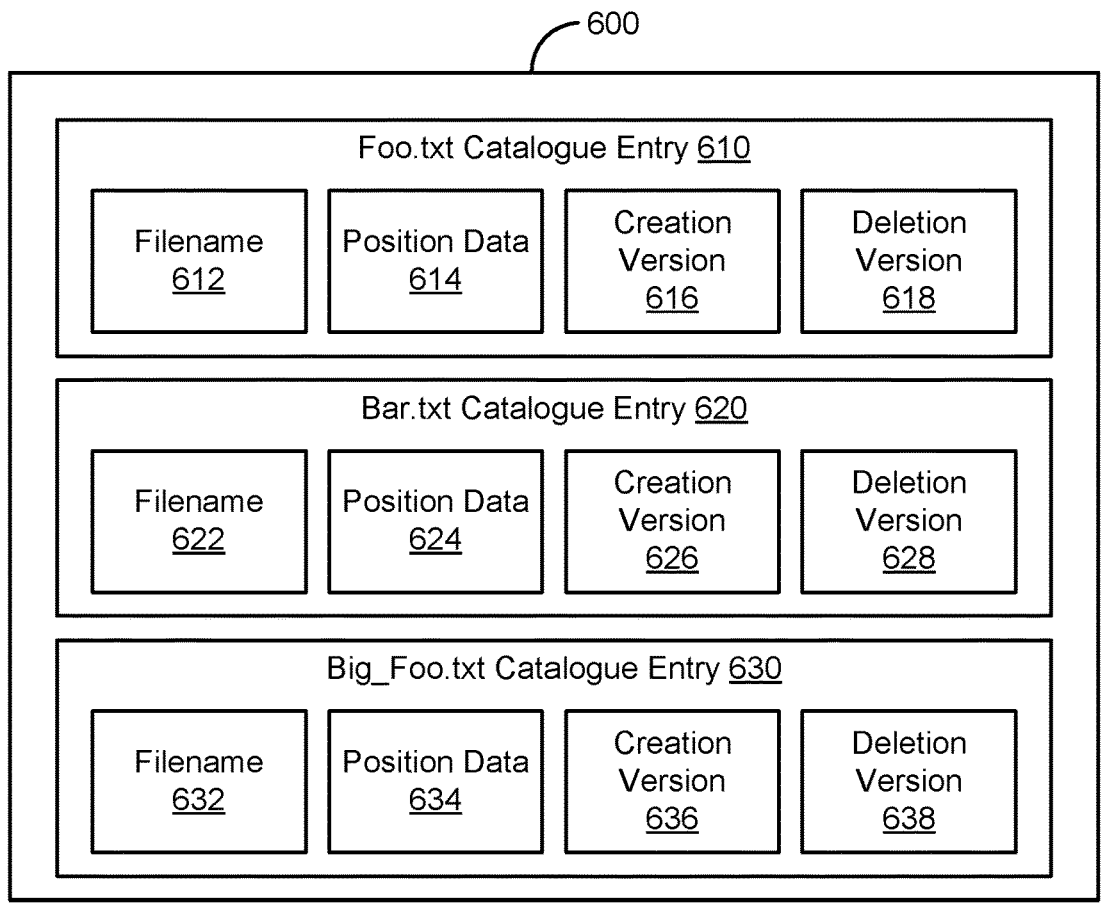
FIG. 6 is a high-level block diagram illustrating a catalogue corresponding to the archive shown in FIG. 5, according to one embodiment.

FIG. 6 shows one embodiment of the catalogue 600 corresponding to the archive 500 shown in FIG. 5. In the embodiment shown in FIG. 6, the catalogue 600 has a first entry 610, a second entry 620, and a third entry 630. In many embodiments, each entry includes additional metadata, such as the size of the file, access time-stamps, modification time-stamps, access-control information, and the like. This additional metadata is not shown in FIG. 6 in the interests of brevity.

Referring again to the embodiment shown in FIG. 6, the first entry 610 relates to Foo.txt 412 and includes a filename 612 (Foo.txt), position data 614 (block one 512 at offset one 510), a creation version 616 (the first snapshot 410), and a deletion version 618 (the second snapshot 420). The second entry 620 relates to Bar.txt 424 and includes a filename 622 (Bar.txt), position data 624 (block two 522 at offset two 520), a creation version 626 (the second snapshot 420), and a deletion version 628 (the third snapshot 430). The third entry 630 relates to Big_Foo.txt 436 and includes a filename 632 (Big_Foo.txt), position data 634 (blocks three 532 and four 534 at offsets three 530 and four 540, respectively), a creation version 636 (the third snapshot 430), and a deletion version 638 (infinity). Note that for files that are archived in more than one block, those blocks are not necessarily adjacent, and the position data indicates the location of each block that includes a portion of the archived files. In various embodiments, where some of these blocks are adjacent, the entry indicates the location of each block individually, the location of the first block and the number of adjacent blocks used, the location of the first and last such blocks, or the like. In other embodiments, the catalogue 600 includes different or additional data. Furthermore, the metadata may be arranged in a different manner.

Computing System Architecture

Figure 7:
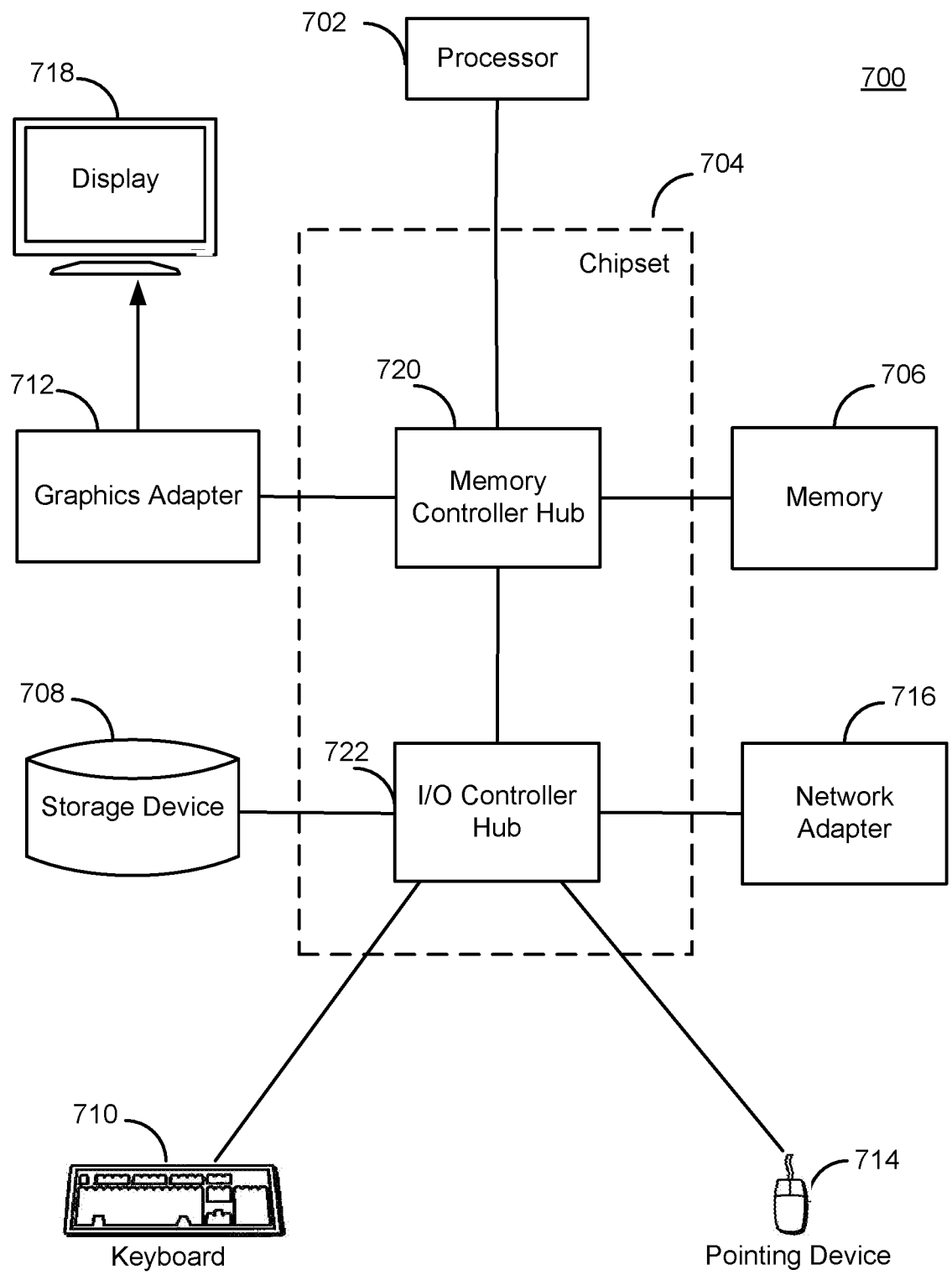
FIG. 7 is a high-level block diagram illustrating a computer suitable for use in the networked computing environment, according to one embodiment.

FIG. 7 is a high-level block diagram illustrating an example computer 700 suitable for use as a backup system 110, archive system 120, or client device 140. The example computer 700 includes at least one processor 702 coupled to a chipset 704. The chipset 704 includes a memory controller hub 720 and an input/output (I/O) controller hub 722. A memory 706 and a graphics adapter 712 are coupled to the memory controller hub 720, and a display 718 is coupled to the graphics adapter 712. A storage device 708, keyboard 710, pointing device 714, and network adapter 716 are coupled to the I/O controller hub 722. Other embodiments of the computer 700 have different architectures.

In the embodiment shown in FIG. 7, the storage device 708 is a non-transitory computer-readable storage medium such as a hard drive, compact disk read-only memory (CD-ROM), DVD, or a solid-state memory device. The memory 706 holds instructions and data used by the processor 702. The pointing device 714 is a mouse, track ball, or other type of pointing device, and is used in combination with the keyboard 710 to input data into the computer system 700. The graphics adapter 712 displays images and other information on the display 718. The network adapter 716 couples the computer system 700 to one or more computer networks, such as network 130.

The types of computers used by the entities of FIGS. 1-3 can vary depending upon the embodiment and the processing power required by the entity. For example, the backup system 110 might include a distributed database system comprising multiple blade servers working together to provide the functionality described herein. Furthermore, the computers can lack some of the components described above, such as keyboards 710, graphics adapters 712, and displays 718. In addition, the example computer 700 provides the architecture to execute the processes below in FIGS. 7-11 in addition to those of FIGS. 1-3.

Exemplary Methods

Figure 8:
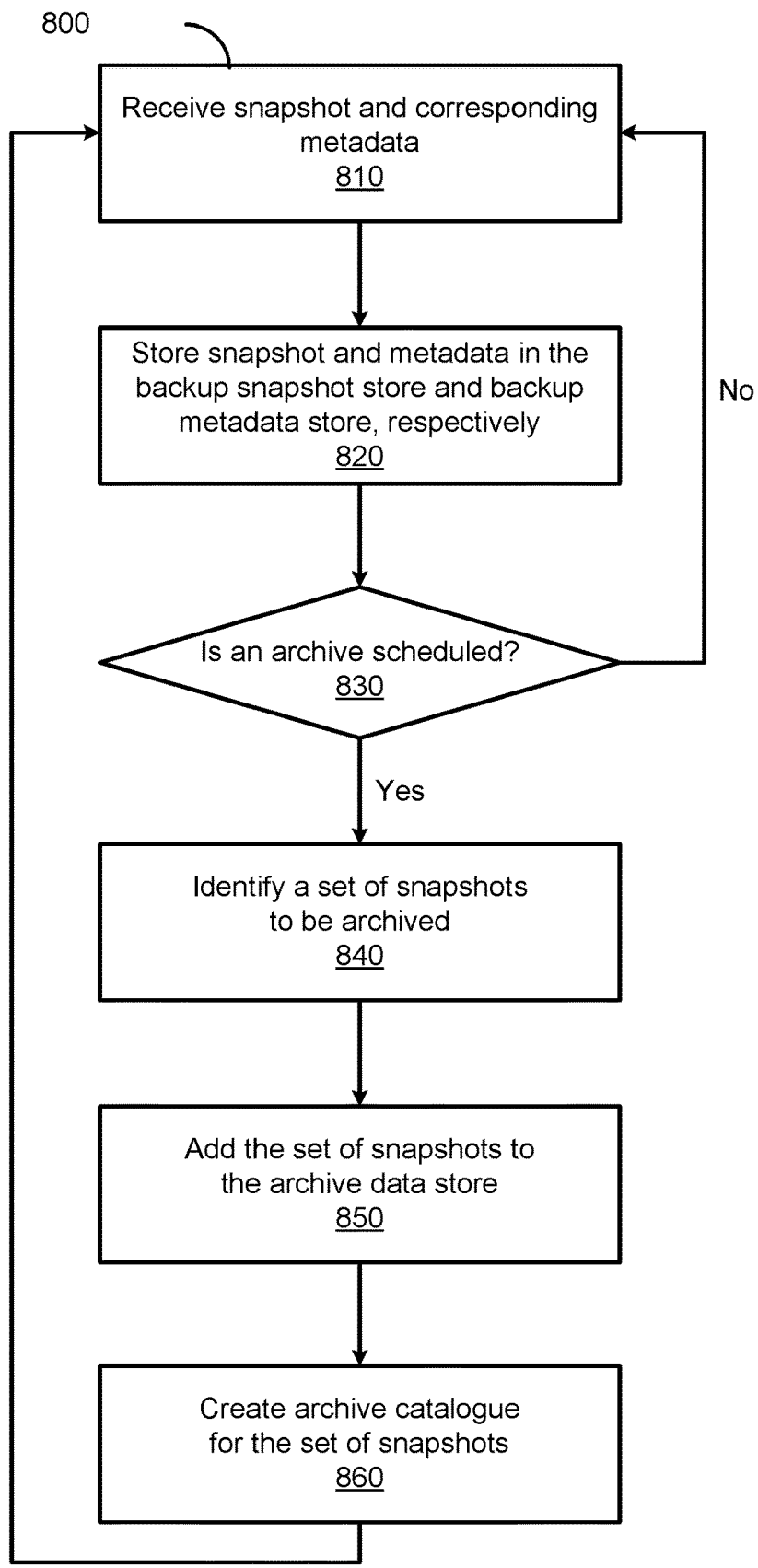
FIG. 8 is a flow chart illustrating a method for backing up and archiving multiple snapshots, according to one embodiment.

FIG. 8 illustrates one embodiment of a method 800 for archiving multiple snapshots. The steps of FIG. 8 are illustrated from the perspective of the backup system 110 and archive system 120 performing the method 800. However, some or all of the steps may be performed by other entities or components. In addition, some embodiments may perform the steps in parallel, perform the steps in different orders, or perform different steps. Note that, for clarity, the method 800 is described with reference to a hypothetical scenario where a single client device's files are being backed up. In practice, the data from many (e.g., hundreds of) client devices 140 will be backed up by the system.

The method 800 begins with the backup subsystem 110 receiving 810 a snapshot from a client device 140. In one embodiment, the received snapshot includes the data from the client device 140 that are subject to backup and the corresponding metadata, including file names, time-stamps, and access-control information for the files. In other embodiments, the backup system 110 initially receives only the metadata and requests only that data which is not already available in the backup snapshot store 116 from previous backup cycles. Regardless of the precise manner in which the snapshot is obtained, the backup subsystem 110 stores the files and corresponding metadata in the backup content store 116 and backup metadata store 118, respectively.

If no archive operation is scheduled 830, the method 800 returns to the start and waits for the appropriate time to receive 810 another snapshot (e.g., the next day, as part of a daily backup schedule). However, if an archive operation is scheduled 830, the archive system 120 identifies 840 a set of snapshots to archive. For example, if snapshots are retained for six months, the archive system 120 identifies snapshots that are more than six months old.

The archive system 120 adds the set of snapshots to the archive data store 126. In one embodiment, the archive subsystem 120 creates a new archive in the archive data store 126 and adds 850 the data from the set of snapshots without further processing. In another embodiment, the archive system 120 analyzes the set of snapshots to identify duplicate data that is included in multiple snapshots (e.g., the file, Foo.txt 412, which appeared in two snapshots in the exemplary set 400 shown in FIG. 4). The archive system 120 then adds 850 a copy of each unique file or file version to the archive data store 126. For example, if Foo.txt 412 is unchanged between the first snapshot 410 and the second snapshot 420, then it is only included in the archive data store 126 once. However, if the file has been modified, then a copy of each version is made. In other embodiments, different or additional methods are used to efficiently store the data included in the set of snapshots. Note that due to duplication of data between snapshots, at the time of archiving, content data from a snapshot may already be included in the archive data store 126, but the current archive in the archive catalogue store 128 may not include a corresponding file entry.

The archive system 120 also creates 860 a catalogue for the newly created archive. As described previously, the catalogue includes the metadata corresponding to the files and folders included in the archive. If this is the first archive created by the system or a fresh catalogue is required (e.g., because of data corruption) then the archive system 120 creates the catalogue from scratch. An exemplary method for creating a new catalogue is described below, with reference to FIG. 9. However, in most instances, the archive system 120 will construct the catalogue based on the catalogue of a previous archive. An exemplary method for constructing the catalogue based on a previous catalogue is described below, with reference to FIG. 10.

Regardless of the how the catalogue is created, the method 800 returns to the start and waits for the next backup snapshot to be received 800. Thus, the method 800 loops for as long as the system is operational, maintaining an archive of the data stored on the client device 140. In principal, the archives can be stored indefinitely. However, in practice, archives are typically discarded and the storage reused after ten to fifteen years. This reduces storage requirements and is unlikely to cause any problems, because there is little chance that users will request recovery of data that was deleted from the client device 140 such a long time ago.

Figure 9:
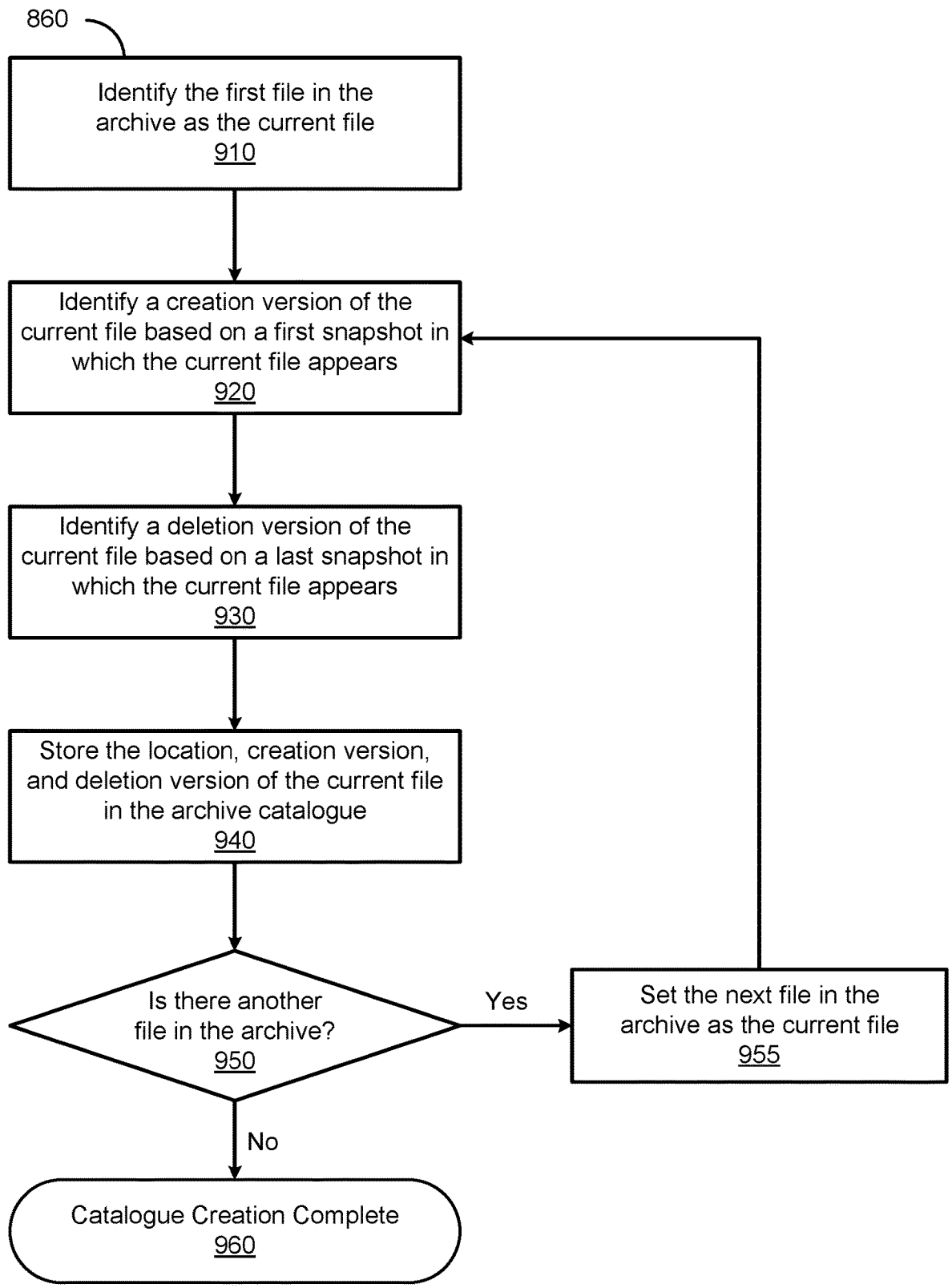
FIG. 9 is a flow chart illustrating a method for creating an initial unified time-indexed catalogue for multiple archived snapshots, according to one embodiment.

FIG. 9 illustrates one embodiment of a method 860 for creating an initial unified time-indexed catalogue for multiple archived snapshots. The steps of FIG. 9 are illustrated from the perspective of the archive system 120 performing the method 860. However, some or all of the steps may be performed by other entities or components. In addition, some embodiments may perform the steps in parallel, perform the steps in different orders, or perform different steps.

In the embodiment shown in FIG. 9, the method 860 begins with the archive system 120 identifying 910 the first file (or folder) in the archive as the current file. Although the term "first file" is used, this should not be taken to require that the file is located in any particular position in the archive data store 126. This designation merely signifies that it is the first file to be processed. Any appropriate method may be used to determine the order in which files are processed, including sorting by storage address, sorting alphabetically by filename, and sorting chronologically by creation time.

The archive system 120 identifies 920 the creation version of the current file and identifies 930 the deletion version of the current file. In one embodiment, the archive subsystem determines the creation version to be the first snapshot in which the file appears and the deletion version to be the last snapshot in which the file appears (or infinity, if the file appears in the last snapshot of the set) based on metadata in the backup metadata store 118, as described previously. In other embodiments, other methods for determining the creation and deletion version are used.

The archive system 120 stores 940 an indicator of the location of the file in the archive along with the identified creation and deletion versions. In one embodiment, the archive system 120 stores the filename, a pointer to the file, and numerical identifiers of the first and last snapshots (i.e., the creation and deletion versions) as a catalogue entry in the archive catalogue store 128). In other embodiments, other approaches to storing the catalogue data are used.

Next, the archive system 120 determines 950 whether there is another file in the archive. If not, creation of the catalogue in complete 960, and the method 860 ends. If so, the archive system 120 sets 955 the next file in the archive as the current file, and the method returns to step 920 to create a catalogue entry for the next file. Note that in some embodiments, two or more files may be processed in parallel. It is not necessarily required that processing of one file is complete before processing of the next begins.

Figure 10:
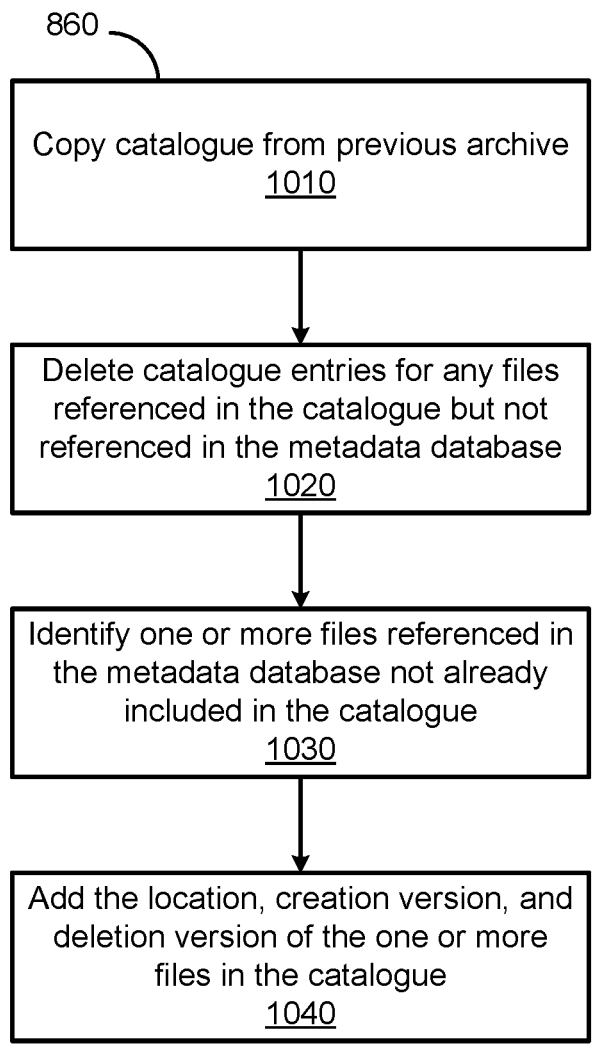
FIG. 10 is a flow chart illustrating a method for creating a unified time-indexed catalogue from an earlier catalogue, according to one embodiment.

FIG. 10 illustrates one embodiment of a method 860 for creating a unified time-indexed catalogue from an earlier catalogue. The steps of FIG. 10 are illustrated from the perspective of the archive system 120 performing the method 860. However, some or all of the steps may be performed by other entities or components. In addition, some embodiments may perform the steps in parallel, perform the steps in different orders, or perform different steps.

In the embodiment shown in FIG. 10, the method 860 begins with the archive system 120 copying the catalogue of a previous archive. As many of the files included in the set of snapshots are likely to be unchanged from the snapshots archived in the previous archive cycle, the copied catalogue provides a good base point from which to efficiently create the catalogue for the current archive.

The archive system 120 deletes 1020 entries in the catalogue for files that are not referenced in the metadata corresponding to the set of snap shots. In one embodiment, the archive system 120 steps through the catalogue entries and searches for each one in the backup metadata store 118. As the backup metadata is indexed in a database, it can be efficiently searched to determine whether metadata is present for each file. Because the metadata is deleted from the database once the snapshots containing the corresponding files have all been archived, if a file is not referenced in the backup metadata store 118, it will also not be in the set of snapshots being archived. Consequently, the corresponding catalogue entry should be deleted. For example, if the copied catalogue covers the time span T1 to T2, and the catalogue being built covers the time span T3 to T4 (where T1<T2<=T3<T4), then an entry with a deletion version less than or equal to T3 can be deleted because the corresponding file is not present in any of the snapshots covered by the catalogue (assuming the deletion version indicates the first snapshot that does not include the file). However, if the deletion version is infinity, the file may still not be present in any of the current snapshots (e.g., if it was deleted at T2). Therefore, the archive system 120 also checks the backup metadata store 118 in such instances. If neither source indicates a deletion version less than or equal to T3 then the entry is not deleted and will be part of the completed catalogue.

The archive system 120 also identifies 1030 one or more files referenced in the backup metadata store 118 that are not already included in the copied catalogue. These are files that have been created (or modified) since the last archive. Therefore, the archive system 120 stores 1040 the location, creation version, and deletion version of these files in the catalogue. For example, returning to the previous example, if a file has a creation version less than T4, is not already included in the catalogue, and has a deletion version greater than T3, the archive system 120 add it to the catalogue. Thus, the archive system 120 has updated the catalogue from the previous archive cycle to accurately represent the current archive using less processing resources than would be required to generate the catalogue from scratch.

Figure 11:
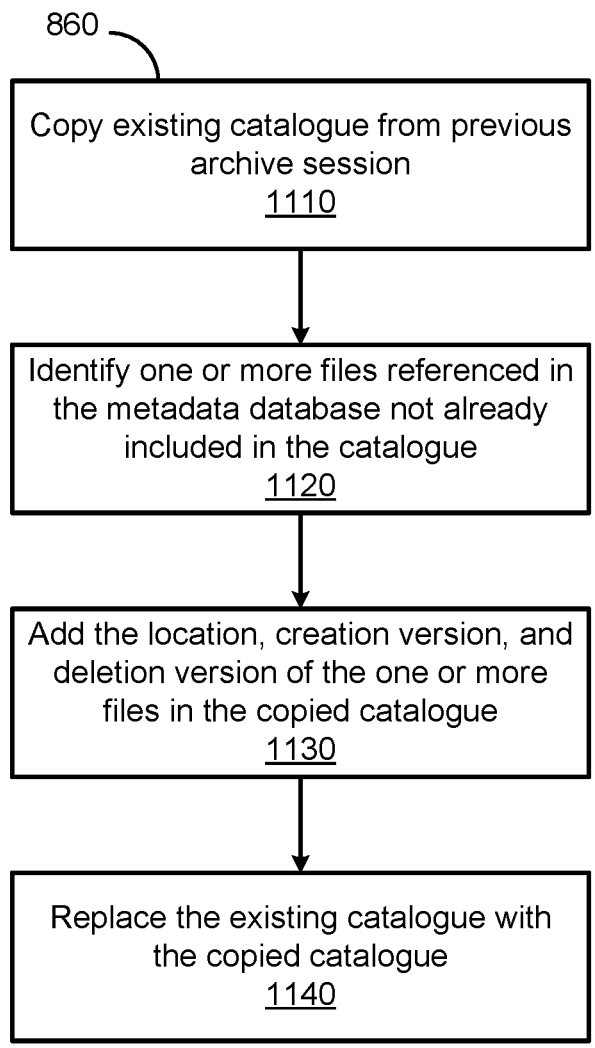
FIG. 11 is a flow chart illustrating a method for updating a unified time-indexed catalogue, according to one embodiment.

FIG. 11 illustrates an alternate embodiment where two or more archives share a single, unified catalogue. In the embodiment shown in FIG. 11, the method 860 begins with the archive system 120 copying 1110 the existing catalogue from the previous archiving session. Alternatively, the archive system 120 may modify the catalogue directly. However, creating a copy for processing provides protection against a failed archive operation corruption the master catalogue data.

The archive system 120 identifies 1120 one or more files reference in the backup metadata store 118 that are not already included in the catalogue. Once these files have been identified 1120, the archive system 120 adds 1130 the locations, creation versions, and deletion version of these files to the copy of the catalogue. These steps are performed in much the same way described above with reference to steps 1030 and 1040 of FIG. 10. Once the copied catalogue has been updated (assuming the update was successful), the archive system 120 replaces 1140 the existing catalogue with the updated copy. Thus, a single catalogue that includes the metadata for multiple archives can be maintained, saving on storage requirements.

Additional Considerations

Upon reading this disclosure, those of skill in the art will appreciate still additional alternative structural and functional designs for a system and a process for electronically creating a unified time-indexed catalogue for multiple archived snapshots. Thus, while particular embodiments and applications have been illustrated and described, it is to be understood that the present disclosure is not limited to the precise construction and components disclosed herein and that various modifications, changes and variations which will be apparent to those skilled in the art may be made in the arrangement, operation and details of the method, system, and storage medium disclosed herein without departing from the spirit and scope as defined in the appended claims.

In this description, the term "module" refers to computational logic for providing the specified functionality. A module can be implemented in hardware, firmware, or software, or a combination thereof. Where the modules described herein are implemented as software, the module can be implemented as a standalone program, but can also be implemented through other means, for example as part of a larger program, as a plurality of separate programs, or as one or more statically or dynamically linked libraries. In one embodiment, program modules are stored on the storage device 708, loaded into the memory 706, and executed by the processor 702.

It will be understood that the named modules described herein represent one embodiment of the present invention, and other embodiments may include other modules. In addition, other embodiments may lack modules described herein or distribute the described functionality among the modules in a different manner. Additionally, the functionalities attributed to more than one module can be incorporated into a single module. In an embodiment where the modules as implemented by software, they are stored on a computer readable persistent storage device (e.g., hard disk), loaded into the memory, and executed by one or more processors included as part of the networked computing environment 100. Alternatively, hardware or software modules may be stored elsewhere within networked computing environment 100. The networked computing environment 100 includes hardware elements necessary for the operations described here, including one or more processors, high speed memory, hard disk storage and backup, network interfaces and protocols, input devices for data entry, and output devices for display, printing, or other presentations of data.

Numerous variations from the system architecture of the illustrated networked computing environment 100 are possible. The components of the networked computing environment 100 and their respective functionalities can be combined or redistributed. For example, a single computer coupled with arrays of backup and archive storage may control the backup system 110 and the archive system 120.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

What is claimed is:

1. A system comprising:
a backup system comprising (i) a non-volatile backup data storage configured to store, from a client device, a plurality of backup snapshots that are created at different times, each backup snapshot including one or more data files of the client device, and (ii) a non-volatile backup metadata storage configured to store metadata of data files that are found in at least one of the backup snapshots stored in the backup data storage; and
an archive system for migrating the backup snapshots from the backup system to the archive system as archived snapshots, the archive system communicably coupled to the backup system, the archive system configured to:
store a plurality of catalogues, the plurality of catalogues including a previous archive catalogue shared by a plurality of previously archived snapshots, the previous archive catalogue comprising the metadata corresponding to the plurality of previously archived snapshots, the previous archive catalogues comprising a first catalogue entry for a first data file and a second catalogue entry for a second data file, the first catalogue entry comprising a first deletion version field corresponding to a first snapshot identifier identifying that one of the previously archived snapshots captures a deletion of the first data file, the second catalogue entry comprising a second deletion version field corresponding to a non-empty value that is used to indicate that the second data file was not deleted in the plurality of previously archived snapshots;
receive, in one or more archive operations and from the backup system, a plurality of newly archived backup snapshots, the plurality of newly archived backup snapshots being backup snapshots that are received in the one or more archive operations;
create a new archive catalogue in response to the plurality of newly archived backup snapshots being migrated to the archive system, the new archive catalogue comprising the metadata corresponding to the plurality of newly archived backup snapshots being migrated to the archive system, the new archive catalogue shared by the plurality of newly archived backup snapshots, creating the new archive catalogue comprising copying the previous archive catalogue and updating the copied previous archive catalogue to generate the new archive catalogue, wherein updating the copied previous archive catalogue to generate the new archive catalogue comprises configuring the archive system to:
(i) delete, responsive to the first snapshot identifier in the first catalogue entry corresponding to one of the previously archived snapshots, the first catalogue entry,
(ii) determine that one of the newly archived backup snapshots received from the backup system captures that the second data file has been deleted, and
(iii) revise the second deletion version field from the non-empty value to a second snapshot identifier corresponding to the one of the newly archived backup snapshots that captures that the second data file has been deleted;
add the new archive catalogue to the plurality of catalogues and store the plurality of catalogues in the archive system, the plurality of catalogues including the previous archive catalogue and the new archive catalogue, the archive system maintaining the plurality of previously archived snapshots and the plurality of newly archived backup snapshots, wherein the archive system uses the previous archive catalogue to record the metadata corresponding to the plurality of previously archived snapshots that share the previous archive catalogue and uses the new archive catalogue to record the metadata corresponding to the plurality of newly archived backup snapshots that share the new archive catalogue; and
provide, to the backup system, an indication that the one of the newly archived backup snapshots that captures that the second data file has been deleted has been archived, the indication causing the backup system to delete the metadata of the second data file in the backup metadata storage.

2. The system of claim 1, wherein the metadata in the backup metadata storage comprises at least one of: a filename of the one or more files, a modification time-stamp of the one or more files, or access control data for the one or more files.

3. The system of claim 1, wherein the new archive catalogue comprises a serial list of catalogue entries, each catalogue entry corresponding to one of the data files and including the metadata corresponding to the one of the data files.

4. The system of claim 1, wherein the metadata in a catalogue entry comprises a filename, and an indication of one or more locations of one of the data files included in one of the backup snapshots.

5. The system of claim 1, wherein the archive system is further configured to:
determine that an incoming data file in one of the plurality of newly archived backup snapshots is identical to an existing file stored in the archive system; and
determine not to add the incoming data file to the archive system.

6. The system of claim 1, the backup system is further configured to:
determine an age of a particular backup snapshot; and
transmit the particular backup snapshot to the archive system responsive to the age being greater than a backup retention period.

7. The system of claim 1, wherein the archive system is further configured to:
receive a request for recovery of a particular file stored in the archive system;
identify a catalogue that references the particular file;
locate in the identified catalogue an entry corresponding to the particular file;
recover content data of the particular file from one or more locations within the archive system based on the identified catalogue; and
provide the particular file in response to the request.

8. The system of claim 7, wherein the request indicates a time corresponding to when the particular file was backed up, and the catalogue is identified based on the time.

9. The system of claim 7, wherein finding the entry corresponding to the particular file comprises walking through the identified catalogue by sequentially checking each entry in the identified catalogue, starting with a first entry, until the entry corresponding to the particular file is found.

10. The system of claim 1, wherein the non-volatile backup data storage of backup system is a random access storage and the archive system is a sequential access storage.

11. A computer-implemented method comprising: storing, at an archive system, a plurality of catalogues, the plurality of catalogues including a previous archive catalogue shared by a plurality of previously archived snapshots, the previous archive catalogue comprising meta data corresponding to the plurality of previously archived snapshots, the previous archive catalogues comprising a first catalogue entry fora first data file and a second catalogue entry for a second data file, the first catalogue entry comprising a first deletion version field corresponding to a first snapshot identifier identifying that one of the previously archived snapshots captures a deletion of the first data file, the second catalogue entry comprising a second deletion version field corresponding to a non-empty value that is used to indicate that the second data file was not deleted in the plurality of previously archived snapshots;
- receiving, in one or more archive operations and from a backup system, a plurality of newly archived backup snapshots, the plurality of newly archived backup snapshots being backup snapshots that are received in the one or more archive operations, the backup system comprising (i) a non-volatile backup data storage configured to store, from a client device, the plurality of backup snapshots that are created at different times, each backup snapshot including one or more data files of the client device, and (ii) a non-volatile backup metadata storage configured to store the metadata of data files that are found in at least one of the backup snapshots stored in the backup data storage;
- creating a new archive catalogue in response to the plurality of newly archived backup snapshots being migrated to the archive system, the new archive catalogue comprising the metadata corresponding to the plurality of newly archived backup snapshots being migrated to the archive system, the new archive catalogue shared by the plurality of newly archived backup snapshots, creating the new archive catalogue comprising copying the previously archive catalogue and updating the copied previous archive catalogue to generate the new archive catalogue, wherein updating the copied previous archive catalogue to generate the new archive catalogue comprises:
  - (i) deleting, responsive to the first snapshot identifier in the first catalogue entry corresponding to one of the previously archived snapshots, the first catalogue entry,
  - (ii) determining that one of the newly archived backup snapshots received from the backup system captures that the second data file has been deleted, and
  - (iii) revising the second deletion version field from infinity or the non-empty value to a second snapshot identifier corresponding to the one of the newly archived backup snapshots that captures that the second data file has been deleted;
- adding the new archive catalogue to the plurality of catalogues and store the plurality of catalogues in the archive system, the plurality of catalogues including the previous archive catalogue and the new archive catalogue, the archive system maintaining the plurality of previously archived snapshots and the plurality of newly archived backup snapshots, wherein the archive system uses the previous archive catalogue to record the metadata corresponding to the plurality of previously archived snapshots that share the previously archive catalogue and uses the new archive catalogue to record the metadata corresponding to the plurality of newly archived backup snapshots that share the new archive catalogue; and
- providing, to the backup system, an indication that the one of the newly archived backup snapshots that captures that the second data file has been deleted has been archived, the indication causing the backup system to delete the metadata of the second data file in the backup metadata storage.

12. The method of claim 11, wherein the metadata in the backup metadata storage comprises at least one of: a filename of the one or more files, a modification time-stamp of the one or more files, or access control data for the one or more files.

13. The method of claim 11, wherein the new archive catalogue comprises a serial list of catalogue entries, each catalogue entry corresponding to one of the data files and including the metadata corresponding to the one of the data files.

14. The method of claim 13, wherein the metadata in a catalogue entry comprises a filename, and an indication of one or more locations of one of the data files included in one of the backup snapshots.

15. The method of claim 11, further comprising:
- determining that an incoming data file in one of the plurality of newly archived backup snapshots is identical to an existing file stored in the archive system; and
- determining not to add the incoming data file to the archive system.

16. The method of claim 11, further comprising:
- receiving a request for recovery of a particular file stored in the archive system;
- identifying a catalogue that references the particular file;
- locating in the identified catalogue an entry corresponding to the particular file;
- recovering content data of the particular file from one or more locations within the archive system based on the identified catalogue; and
- providing the particular file in response to the request.

17. The method of claim 16, wherein the request indicates a time corresponding to when the particular file was backed up, and the catalogue is identified based on the time.

18. The method of claim 16, wherein finding the entry corresponding to the particular file comprises walking through the identified catalogue by sequentially checking each entry in the identified catalogue, starting with a first entry, until the entry corresponding to the particular file is found.

19. The method of claim 11, where the non-volatile backup data storage that stores the plurality snapshots is a random access storage and the archive operation is operated by a sequential access storage system.

20. A non-transitory computer-readable medium storing computer program code comprising instructions that, when executed, cause one or more processors to at least:
- store, at an archive system, a plurality of catalogues, the plurality of catalogues including a previous archive catalogue shared by a plurality of previously archived snapshots, the previous archive catalogue comprising meta data corresponding to the plurality of previously archived snapshots, the previous archive catalogues comprising a first catalogue entry fora first data file and a second catalogue entry for a second data file, the first catalogue entry comprising a first deletion version field corresponding to a first snapshot identifier identifying that one of the previously archived snapshots captures a deletion of the first data file, the second catalogue entry comprising a second deletion version field corresponding to a non-empty value that is used to indicate that the second data file was not deleted in the plurality of previously archived snapshots;

receive, in one or more archive operations and from a backup system, a plurality of newly archived backup snapshots, the plurality of newly archived backup snapshots being backup snapshots that are received in the one or more archive operations, the backup system comprising (i) a non-volatile backup data storage configured to store, from a client device, the plurality of backup snapshots t hat are created at different times, each backup snapshot including one or more data files of the client device, and (ii) a non-volatile backup metadata storage configured to store the metadata of data files that are found in at least one of the backup snapshots stored in the backup data storage;

create a new archive catalogue in response to the plurality of newly archived backup snapshots being migrated to the archive system, the new archive catalogue comprising the metadata corresponding to the plurality of newly archived backup snapshots being migrated to the archive system, the new archive catalogue shared by the plurality of newly archived backup snapshots, creating the new archive catalogue comprising copying the previous archive catalogue and updating the copied previous archive catalogue to generate the new archive catalogue, the instructions to update the copied previous archive catalogue to generate the new archive catalogue comprising instructions to:

(i) delete, responsive to the first snapshot identifier in the first catalogue entry corresponding to one of the previously archived snapshots, the first catalogue entry, (ii) determine that one of the newly archived backup snapshots received from the backup system captures that the second data file has been deleted, and (iii) revise the second deletion version field from the non-empty value to a second snapshot identifier corresponding to the one of the newly archived backup snapshots that captures that the second data file has been deleted;

add the new archive catalogue to the plurality of catalogues and store the plurality of catalogues in the archive system, the plurality of catalogues including the previous archive catalogue and the new archive catalogue, the archive system maintaining the plurality of previously archived snapshots and the plurality of newly archived backup snapshots, wherein the archive system using the previous archive catalogue to record the metadata corresponding to the plurality of previously archived snapshots that share the previous archive catalogue and uses the new archive catalogue to record the metadata corresponding to the plurality of newly archived backup snapshots that share the new archive catalogue; and provide, to the backup system, an indication that the one of the newly archived backup snapshots that captures that the second data file has been deleted has been archived, the indication causing the backup system to delete the metadata of the second data file in the backup metadata storage.

21. The non-transitory computer-readable storage medium of claim 20, wherein the metadata in the backup metadata storage comprises at least one of: a filename of the one or more files, a modification time-stamp of the one or more files, or access control data for the one or more files.

22. The non-transitory computer-readable storage medium of claim 20, wherein the new archive catalogue comprises a serial list of catalogue entries, each catalogue entry corresponding to one of the data files and including the metadata corresponding to the one of the data files.

23. The non-transitory computer-readable storage medium of claim 22, wherein the metadata in a catalogue entry comprises a filename, and an indication of one or more locations of one of the data files included in one of the backup snapshots.

24. The non-transitory computer-readable storage medium of claim 20, wherein the instructions, when executed, further causes the one or more processors to:
determining that an incoming data file in one of the plurality of newly archived backup snapshots is identical to an existing file stored in the archive system; and
determining not to add the incoming data file to the archive system.

25. The non-transitory computer-readable storage medium of claim 20, wherein the instructions, when executed, further causes one or more processors to:
receive a request for recovery of a particular file stored in the archive system;
identify a catalogue that references the particular file;
locate in the identified catalogue an entry corresponding to the particular file;
recover content data of the particular file from one or more locations within the archive system based on the identified catalogue; and
provide the particular file in response to the request.

* * * * *